United States Patent
Qiu et al.

(10) Patent No.: US 9,464,173 B2
(45) Date of Patent: Oct. 11, 2016

(54) LATEX PREPARATION USING AN AGITATED REACTOR COLUMN

(71) Applicant: Xerox Corporation, Norwalk, CT (US)

(72) Inventors: Shigang Qiu, Toronto (CA); David J W Lawton, Oakville (CA); Chieh-min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 93 days.

(21) Appl. No.: 14/571,296

(22) Filed: Dec. 16, 2014

(65) Prior Publication Data

US 2016/0168337 A1 Jun. 16, 2016

(51) Int. Cl.
*C08J 3/09* (2006.01)
*G03G 9/08* (2006.01)

(52) U.S. Cl.
CPC ............ *C08J 3/095* (2013.01); *G03G 9/0808* (2013.01); *C08J 2367/00* (2013.01)

(58) Field of Classification Search
CPC .............................. C08J 3/095; G03G 9/0808
USPC ...................... 430/137.21; 523/339; 524/801
See application file for complete search history.

(56) References Cited

U.S. PATENT DOCUMENTS 9,134,635 B1 * 9/2015 Lawton ............... B01F 7/00116

* cited by examiner

*Primary Examiner* — Edward Cain

(57) ABSTRACT

A process for making a latex by phase inversion emulsification in an agitated reactor column is described.

20 Claims, No Drawings

LATEX PREPARATION USING AN AGITATED REACTOR COLUMN

FIELD

The present disclosure relates to processes for producing resin emulsions continuously using an agitated reactor column.

BACKGROUND

Traditional techniques for preparing toner include preparing include grinding resin to a fine powder, which is sifted to recover particles of desired size. That process is time consuming and results in a toner product were the particles are not homogenous in shape or size. More recently, emulsion aggregation (EA) methods for producing toner are used. EA techniques may involve a batch or semi-continuous emulsion polymerization, as disclosed in, for example, U.S. Pat. No. 5,853,943, the entire disclosure of which herein is incorporated by reference in entirety. Other examples of EA/coalescing processes are illustrated in U.S. Pat. Nos. 5,902,710; 5,910,387; 5,916,725; 5,919,595; 5,925,488, 5,977,210 and 5,994,020, and U.S. Pub. No. 2008/0107989, the entire disclosure of each of which herein is incorporated by reference in entirety.

Previous one-solvent and two-solvent processes of phase inversion emulsification (PIE) to produce resin particles for making toner are known to produce latex particles of from about 140 to about 230 nm in size (see, e.g., U.S. Pub. Nos. 20110200930 and 20110281215, the entire disclosure of each of which herein is incorporated by reference in entirety), which may not be suitable for effective dispersion of for example, carbon black pigment particles. The organic solvents, for example, methyl ethyl ketone (MEK) and isopropanol (IPA) are used to dissolve the resins to prepare an organic phase containing the dissolved resin and after an optional step of neutralizing resin acid groups by adding a base to the dissolved resin mixture, phase inversion is induced by adding water to produce an oil in Water (O/W) dispersion or emulsion comprising resin particles, and finally, the liquids, that is solvent(s) and water are removed, for reuse in a subsequent PIE reaction, to yield a latex.

Organic solvent(s) and water are removed from a PIE reaction, an organic-rich fraction comprises primarily organic solvent(s) and a smaller amount of any neutralizing agent and water, and a water rich fraction comprises primarily water with smaller amounts of organic solvent(s) and any neutralizing agent. The solvent-rich fragment can be refreshed with neat organic solvent(s) and used to dissolve resin in a subsequent PIE reaction. The water-rich fraction can be used in a subsequent PIE reaction to induce phase inversion.

The PIE process generally is practiced in batch mode, which is time and energy consuming. Attempting to achieve economies of scale for that method is not usually successful because scaling up the process to larger reactors results in a lower surface to volume ratio resulting in greater distillation time to remove the solvent which increases the time and cost of the overall process. A cost effective method of making latex for toner at high yield would be beneficial.

SUMMARY

The instant disclosure describes a continuous phase inversion emulsification (PIE) process using an agitated reactor column (ARC) to prepare a resin emulsion for toner.

In embodiments, a method for making a resin emulsion comprises combining resin, solvent(s), an optional neutralizing agent, an optional surfactant and water to form a mixture, optionally neutralizing the resin in the mixture, optionally in an ARC, adding water and the mixture to an ARC to obtain phase inversion to obtain an oil in water emulsion and optionally recovering the emulsion or the resin particles.

In embodiments, the ARC has a flow through design with an agitator spinning coaxially with the fluid flow through the ARC. Water to invert the emulsion phases may be added before or during passage of the emulsion through the ARC, from one or more ports. The ARC can comprise one Or more blades to mix or to stir the emulsion, which blade or blades may comprise one or more holes or voids therein.

In embodiments, the continuous process may be controlled by at least two pumps, one controlling emulsion feed and one controlling water addition, and optionally, one controlling neutralizing solution addition.

DETAILED DESCRIPTION

In embodiments, the present method provides a continuous PIE process that can handle large quantities of feed slurry or resin emulsion or mixture without relying on large batch tanks. That is obtained using one or more ARC's of smaller size and volume than that of an industrial batch reactor, through which nevertheless large quantities of fluid can passed and be processed.

Briefly, an ARC can comprise a cylindrical or tubular structure, wherein the cylinder can have a regular or uniform interior longitudinal channel or void, wherein the cylindrical channel comprises an inner wall defined by the cylindrical structure. One or more mixing shafts are located at a center of the cylindrical channel or presented in an array in the longitudinal void, wherein a longitudinal axis of the mixing shaft is parallel to a longitudinal axis of the cylinder. In embodiments, the one or more shafts are located in a site or area outside of a center of cylindrical channel, that is, are offset. In embodiments, the one or more shafts can describe a path parallel to an inside circumference or longitudinal axis of the cylinder. The one or more shafts can move in a planetary motion. In embodiments, the shaft(s) are configured along the length of the cylinder. One or more impellers are attached to the mixing shaft(s), wherein the one or more impellers have one or more holes or voids in a blade, propeller or other paddle-like structure to enhance a stirring motion, the holes or void reducing resistance of movement of the paddle-like structures in the liquid. The holes or voids can induce further fluid movement aside from a circumferential movement to one that can comprise a vortex or vortices, an eddy or eddies and the like at or near a propeller-like structure. A diameter of a mixing shaft, including any propeller-like structure(s) can be about 15% to about 95% of the diameter of the inner wall. In the case of at least two shafts, the array of plural mixing shafts is arranged so that the impellers do not impinge, touch, scrape and so on an internal wall of the cylinder or one another, although propeller-like structures from adjacent shafts can interdigitate, mesh and the like.

Also described herein an apparatus comprising, a hollow vessel, wherein a length of the hollow vessel is greater than a width of the hollow vessel, and an inner surface of the hollow vessel is cylindrical, one or more mixing rods are located at a center, central portion or within the hollow vessel, wherein a longitudinal axis of the mixing rod(s) is parallel to a longitudinal axis of the hollow vessel, and one or more impellers are connected to the mixing rod(s), wherein the impellers can be perforated.

The propeller-like structures can be of any shape or orientation, such as, a longitudinal blade, plural blades of different size or shape and so on as a design choice, the goal being providing adequate up through maximal mixing or agitation forces on and to the resin mixture.

An ARC comprises a hollow tube, wherein the hollow tube has a cylindrical inner wall, a length of the tube is greater than a diameter of the tube, one ore more mixing shafts, wherein a mixing shaft is concentric with the hollow tube, a longitudinal axis of the mixing shaft(s) are parallel to a longitudinal axis of the hollow tube, and the mixing shaft(s) are rotatable about the longitudinal axis of the mixing shaft(s), one or more impellers, wherein the impellers are attached to the mixing shaft, the impellers extend radially from the mixing shaft toward the inner wall of the tube and an impeller can comprise one or more holes or voids.

In an embodiment, the ARC comprises an agitator spinning coaxially to the column and coaxially to the overall fluid flow. The agitator can impart high shear forces on the emulsion, the agitator may spin at high rates and can one or more blades or impellers, each with one or more holes or voids. The blade(s) can run the length of the column. The blade(s), measured from the center of the column to the inside wall of the reactor, can be of any width including up to where the distal edge of a blade may just approach the inside wall of the reactor. The blades can radiate from a core or central structure running the length of the column. The central structure can be a centrally mounted drive shaft of the blade(s), agitator(s) and the like. The ARC imparts a mixing profile with uniform shear rate distribution as the emulsion passes through in a plug flow manner through the column. The ARC presents with on-plane mixing (mixing where convection is in the plane orthogonal to the longitudinal axis) while minimizing axial mixing (mixing that convects parallel to the axis, also called back-mixing). The actual configuration of an ARC is a design choice.

The ARC can be made of material that can withstand internal pressure exerted by the emulsion moving within, any supplemental pressure to urge movement of the emulsion in the ARC, any pressure introducing or inducing an elevated temperature of the ARC contents, thereby possibly increasing temperature and so on. Thus, for example, an ARC may be constructed of a metal, such as, an inert metal, such as, stainless steel.

Homogenous mixing can occur throughout the length of the ARC offering the combination of plug flow and consistent agitation. The impeller blade may be arrayed radially from the center of the ARC or may be angled from a non-central location. Each individual blade may be flat, curved or bent. An individual blade may form a spiral, such as, a corkscrew, around the central axis of the impeller, which can act further to drive fluid through the ARC. Impeller blades may be perforated, and the boles or voids may be of any shape and of any number, and may be distributed in any fashion on and throughout the blade. The individual holes or voids may be perpendicular to the blade or drilled at an angle through the blade. An ARC may comprise more than one blade, which plural blades may be the same or different in shape, size, configuration, void number, void pattern and so on. The actual configuration of an ARC is a design choice.

To attain, maintain or adjust the temperature of the fluids and emulsions within, the ARC may have any means of temperature control, including, for example, internal heating elements or devices outside that jacket or impinge on an outside surface of the ARC. In the case of a jacket or similar shroud, layer, film, sheet and the like abutting an outside surface of the ARC to impact or influence temperature of the ARC and hence, the contents thereof by comprising a temperature altering device, such as, a heating element. Alternatively, the external lining or covering can enable the passing or flowing of heating or cooling fluids therethrough or on the surface of the ARC to adjust the temperature of the ARC and thus, the materials therein.

One or more ports, sited as a design choice may be used to inject or to introduce base and/or water into the ARC at one or various locations of the ARC to neutralize resin and/or to invert the emulsion from a water in oil (W/O) emulsion or dispersion to an oil in water (O/W) emulsion or dispersion, namely, comprising the resin latex. Plural ports may be under control of a single unit or device or may be controlled separately in any combination. The base and/or water may be heated prior to adding to the ARC.

The outer design of the reactor may be any shape, whereas the hollow center is generally circular or cylindrical in design with the goal of even and thorough mixing. The length of the tube is generally greater than the diameter of the tube, such that the length aspect ratio (length/diameter) of the tube is about 8 to about 30, for example, from about 10 to about 28, or from about 12 to about 24. One end of the reactor may be sealed, and the opposite end of the reactor may be open. In addition, one end of the reactor may be an input end, wherein materials may be inputted into the reactor, and the opposite end of the reactor may be an output end, wherein the material inputted into the reactor exits the reactor. For example, the reactor may have and inlet port and an outlet port.

The center of the reactor is hollow such that the reactor has an inner interior wall and an outer exterior wall. There may be a space or a void between the inner wall of the reactor and the outer wall of the reactor to enable movement or flow of a fluid or a gas therethrough within the void between the walls, for example, to enable transfer of heat or cold to the ARC and hence, to the contents therein.

Alternatively, as described herein, the reactor may be surrounded by a jacket, a lining, a sheath and so on. A heating or cooling fluid can be introduced into the jacket that surrounds the reactor so that the temperature of the jacket regulates the heating or cooling of the reactor and hence, the fluid in the reactor.

The reactor may be made of any material, for example, a material that readily conducts heat or cold, such as, stainless steel, that allows for an efficient transfer of heat to the inside of the reactor, and that does not react with the components in the reactor.

The mixing shaft(s) may be inserted into the reactor through an open end of the reactor. The mixing shaft(s) can be designed such that the length of the mixing shaft is greater than the width or diameter of the shaft. The mixing shaft(s) can run essentially the length of the reactor. The mixing shaft(s) may be of any shape or design and have any number of sides. For example, a mixing, shaft may be circular, ovoid, square, rectangular and so on. The maximal diameter or width of a mixing shaft (including one or more blades or impellers) is about 15% to about 95% of the diameter of the inner wall. For example, the diameter or width of the mixing shaft may be about 25% to about 75% of the diameter of the inner wall of the reactor, or may be about 30% to about 70% of the diameter of the inner wall of the reactor.

Attached to the mixing shaft are one or more impellers or blades. For example, the impellers may be directly attached to the mixing shaft. The impellers extend from the mixing shaft in a radial direction from the mixing shaft towards the inner wall of the reactor. The impellers may extend to just abut the inner wall of the reactor, but do not contact the inner wall of the reactor. For example, the impellers may extend from the mixing shaft radially for any amount that is less than the radius of the inner wall.

A mixing shaft is positioned such that it can rotate about the longitudinal axis of the mixing shaft. For example, the axis of rotation of the mixing shaft may be located in the center of the reactor, for example, at a point that is about one-half of the diameter of the inner wall, or at point that is concentric with the inner wall of the reactor. In addition, the longitudinal axis of the mixing shaft is substantially parallel to the longitudinal axis of the reactor. Substantially parallel refers, for example, to the longitudinal axis of the mixing shaft differing from the longitudinal axis of the inner wall of the reactor by no more than about 10°.

The ends of the mixing shaft may extend beyond the ends of the reactor. For example, if both ends of the reactor are open, the mixing shaft may extend beyond both ends. However, if only one end of the reactor is open, only one end of the mixing shaft may extend beyond the open end of the reactor. The end(s) of the mixing shaft may be inserted into a drive or motor to rotate the mixing shaft.

The impellers may be mounted to the mixing shaft such that the impellers are off-set from each other. For example, if there are two impellers, one impeller may be mounted such that it is in a more forward position in the rotational direction than the other impeller. In addition, the impellers may extend along a substantial length of the mixing shaft in the longitudinal direction. Hence, a blade can run nearly the entire length of the shaft or of the column. Substantial length refers, for example, to a length of the mixing shaft in which more of the shaft is connected to an impeller than is not. Impellers that extend along a substantial length of the mixing shaft can enable a homogenous mixing, throughout the length of the reactor.

The impellers also contain one or more holes or voids, meaning that, the impellers can be perforated. The impellers may be, for example, substantially perforated. Substantially perforated refers, for example, to impellers in which more of the impeller is perforated than is not perforated. In addition, the perforations may be distributed evenly along the impellers so that the perforations are not clustered in a specific area of the impeller.

One of ordinary skill is be able to determine the seed at which the mixing shaft is rotated to produce the desired mixing and phase inversion. Hence, the one or more mixing shafts can be operated to produce a mixing speed of from about 10 rpm to about 300 rpm, from about 15 to about 275 rpm, from about 20 to about 250 rpm.

The W/O emulsion may be introduced into an ARC under pressure to provide a flow through the ARC of a desired speed. The residence time of an emulsion, that is, the total time an aliquot of an emulsion resides or is contained in an ARC can be about 0.5 min to about 20 mm, from about 1 to about 16 minutes, from about 2 to about 12 minutes Unless otherwise indicated, all numbers expressing quantities, conditions and so forth used in the specification and claims are to be understood as being modified in all instances by the term "about." "About," is meant to indicate a variation of no more than 10% from the stated value. Also used herein is the term, "equivalent" "similar," "essentially," "substantially," "approximating," and "matching," or grammatical variations thereof, have generally acceptable definitions or at the least, are understood to have the same meaning as. "about."

Resins

Any resin may be utilized in forming a latex emulsion of the present disclosure. In embodiments, the resins may be an amorphous resin, a crystalline resin, and/or a combination thereof. In embodiments, the resin may be a polyester resin, including the resins described, for example, in U.S. Pat. Nos. 6,593,049 and 6,756,176, the entire disclosure of each of which herein is incorporated by reference in entirety. Suitable resins also may include a mixture of an amorphous polyester resin and a crystalline polyester resin as described in U.S. Pat. No. 6,830,860, the entire disclosure of which herein is incorporated by reference in entirety. Suitable resins may include either a high molecular weight or a low molecular weight amorphous polyester resin, or a mixture of each.

In addition to polyester resins, other polymeric resins may be used including: polyamides, polyimides, polyolefins, polyethylene, polybutylene, polyisobutyrate, ethylene-propylene copolymers, ethylene-vinyl acetate copolymers, polypropylene, mixtures thereof, and the like. The resins may also be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly (hexylene-succinate), poly(octylene-succinate) poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate) copoly(2,2-dimethylpropane-1,3-diol-decatioate)-copoly(nonylene-decatioate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide) polytethylene-succinimide), and poly(propylene-sebecamid). Examples of polyimide include poly(ethlene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

Examples of unsaturated polyester resins include those disclosed in U.S. Pat. Nos. 6,061,827 or 6,063,827, the entire disclosure of each of which herein is incorporated by reference in entirety. Exemplary resins include, but are not limited to, poly(1,2-propylene fumarate), poly(1,2-propylene maleate), poly(1,2-propylene itaconate) and combinations thereof.

One, two or more resins may be used In embodiments, where two or more resins are used, the resins may be in any suitable ratio (e.g., weight ratio), such as, of from about 1% (first resin)/99% (second resin) to about 99% (first resin)/1% (second resin), in embodiments, from about 10% (first resin)/90% (second resin) to about 90% (first resin)/10% (second resin), Combinations of three or more resins may also be used.

Solvent

Any suitable organic solvent may be used to dissolve the resin, for example, alcohols, esters, ethers, ketones, amines and combinations thereof, in an amount of, for example, from about 30% by weight to about 400% by weight of the resin, from about 40% by weight to about 250% by weight of the resin, from about 50% by weight to about 100% by weight of the resin.

In embodiments, suitable organic solvents, sometimes referred to herein, in embodiments, as phase inversion agents, include, for example, methanol, ethanol, propanol, IPA butanol, ethyl acetate, MEK and combinations thereof. If so desired, a cosolvent may be added. In embodiments, the organic solvent may be miscible or immiscible in water and may have a relatively low boiling point, such as, from about 30° C. to about 120° C. Solvents having lower heat of vaporization and/or lower boiling points may facilitate removal of the solvent(s) at the end of the phase inversion process, such as, by distillation, or vacuum distillation.

In embodiments when at least two solvents are used, the ratio of solvents can be from about 1:1 to about 1:15, from about 1:2.5 to about 1:12.5, from about 1:3 to about 1:10. Thus, if the first solvent is IPA and the second solvent is MEK, the ratio of IPA to MEK can be, for example, about 1:6.

Neutralizing Agent

In embodiments, the resin may be mixed with a base or neutralizing agent. In embodiments, the neutralizing agent may be used to neutralize acid groups in the resin(s), so a neutralizing agent herein may also be referred to as a, "basic neutralization agent" or variations thereof Any suitable basic neutralization reagent may be used in accordance with the present disclosure. In embodiments, suitable basic neutralization agents may include inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof and the like. Substances that generate such suitable basic agents also may be used, such as, adding ammonia gas, quicklime, soda and the like. Lewis bases and Bronsted bases also may be used. An immobilized neutralization agent also may be used where it is undesirable for the neutralization agent to be present later in the process. A buffer of higher pH can be used.

The basic agent may be utilized in an amount of from about 0.001% by weight to 50% by weight of the resin, from about 0.01% by weight to about 25% by weight of the resin, from about 0.1% by weight to 5% by weight of the resin. In embodiments, the neutralizing agent may be added in the form of an aqueous solution. In embodiments, the neutralizing agent may be added in the form of a solid. In embodiments, plural forms of bases can be used in a process of interest. Hence, a process can comprise a first base, and at a different or successive step, a second base is used. The first and second bases can be the same or different.

Utilizing the above basic neutralization agent in combination with a resin possessing acid groups, a neutralization ratio of from about 0.25% to about 500% may be achieved, from about 50% to about 400%, from about 75% to about 300%. In embodiments, the neutralization ratio may be calculated as the molar ratio of basic groups provided with the basic neutralizing agent to the acid groups present in the resin multiplied by 100%.

Addition of a basic neutralization agent may raise the pH of an emulsion including a resin possessing acid groups from about 5 to about 12, from about 6 to about 11. Neutralization of the acid groups may, in embodiments, generate carboxylate ions, enhance formation of the emulsion.

Surfactants

In embodiments, the process of the present disclosure optionally may include adding a surfactant or emulsifier to a resin, optionally at an elevated temperature, in an emulsion, in a dispersion and so on.

Where utilized, a resin emulsion may include one, two or more surfactants. The surfactants may be selected from ionic surfactants and nonionic surfactants. Anionic surfactants and cationic surfactants are encompassed by the term. "ionic surfactants." In embodiments, the surfactant may be added as a solid or as a solution with a concentration of from about 1% to about 100% (pure surfactant) by weight, in embodiments, from about 5% to about 95 by weight. In embodiments, the surfactant may be utilized so as to be present in an amount of from about 0.01% to about 20% by weight of the resin, from about 0.1% to about 15% by weight, from about 1% to about 10% by weight of the resin.

Anionic surfactants which may be utilized include sulfates and sulfonates, such as, sodium dodecylsulfate (SDS), sodium dodecylbenzene sulfonate, sodium dodecylnaphthalene sulfate, dialkyl benzenealkyl sulfates and sulfonates, acids, such as, abietic acid available from Aldrich, NEOGEN®, NEOGEN™ obtained from Daiichi Kogyo Seiyaku, combinations thereof and the like. Other suitable anionic surfactants include, in embodiments, DOWFAX™2A1, an alkyldiphenyloxide disulfonate from The Dow Chemical Company, and/or TAYCA POWER BN2060 from Tayca Corporation (Japan), which are branched sodium dodecylbenzene sulfonates. Combinations of those surfactants and any of the foregoing, anionic surfactants may be utilized, in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12},C_5,C_7$-trimethyl ammonium bromides, halide salts of quaternized polyoxyethylalkylamines, dodecylbenzyl triethyl ammonium chloride, MIRAPOL™ and ALKAQUATT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy)ethanol, available from Rhone-Poulenc as IGEPAL CA210™, IGEPAL CA-520™, IGEPAL, CA-720™, IGEPAL CO-890™, IGEPAL CO-726™, IGEPAL CO-290™, IGEPAL CA-210™, ANTAROX 890™, and ANTAROX 897™. Other examples of suitable nonionic surfactants may include a block copolymer of polyethylene oxide and polypropylene oxide, including those commercially available as SYNPERONIC PE/F, in embodiments. SYNPERONIC PE/F 108. Combinations of those surfactants and any of the foregoing surfactants may be utilized, in embodiments.

Water

The resin W/O emulsion may include a small quantity of water, in embodiments, de-ionized water (DIW), in amounts of from about 05% to about 40%, from about 10% to about 30%, by weight or volume relative to the emulsion, optionally at temperatures that melt, soften or dissolve the resin, of from about 25° C. to about 120° C. from about 35° C. to about 95° C. Additional water is added to the ARC to induce phase inversion of the mixture to an O/W emulsion, forming the latex.

Processing

An initial polymer resin solution is obtained by mixing polymer resin, solvent, optional neutralizing base, optional surfactant and water. The first step may be performed in a batch while the remainder of the process is produced continuously. The W/O emulsion can be prepared in a continuous reactor, which can be an ARC. Reagents can be introduced into a reactor simultaneously or consecutively, and the reagents can be heated before, during or after mixing to form the W/O emulsion. The mixture can be heated, can be mixed and the like to form a stable W/O emulsion.

In embodiments, a neutralizing agent is included in the mixture. In embodiments, a neutralizing agent is added to the W/O emulsion. In embodiments, the neutralizing agent is added to the emulsion in a first ARC. In embodiments, a neutralizing agent is added to the mixture and to the W/O emulsion. The same or different neutralizing agents can be used when plural introductions of neutralizing agent are employed. Thus, depending on the acid number of the resin of interest, the resin mixture can be passed through a first ARC to enable neutralization of the resin by addition of a neutralizing agent before, with or after adding of the emulsion to the first ARC.

The output from the batch, continuous or first ARC is passed to an ARC, a second ARC when a first is used, for PIE. Thus, when a first ARC is not needed for resin neutralization, the W/O emulsion is added directly to the ARC. The second ARC or the ARC when a first is not used, can be identified as a PIE ARC. Water is added before, with or directly to the second or PIE ARC to induce phase inversion. An ARC provides high shear forces and facilitates mixing and/or phase inversion of the emulsion. In the case of phase inversion, the resulting product is an O/W emulsion, which is a latex.

Throughout the process, the temperature is maintained to keep all liquid streams liquid and to enhance productivity of the reactions. The resin mixture can heated to a temperature, for example, of from about 25° C. to about 120° C., from about 30° C. to about 110° C., from about 40° C. to about 100° C. The heating need not be held at a constant temperature, but may be varied. For example, the heating may be slowly or incrementally increased until a desired temperature is achieved. Reagents also can be heated, such as, neutralizing agent, water and so on.

Following phase inversion, additional optional surfactant, water or optional neutralizing agent optionally may be added to dilute the phase inversed emulsion, although not required. Following phase inversion, the phase inversed emulsion may be cooled to room temperature (RT), for example from about 20° C. to about 25° C.

The solvents in the resulting latex mixture can be removed, or stripped and can be reused in a subsequent PIE, the solvent-rich portion can be used to dissolve resin to make the W/O emulsion.

The aqueous portion of the PIE can be removed from the latex. In the case of vacuum distillation, the water fraction can be removed to provide a high solids content latex. The obtained water faction, which may contain any surfactant, any neutralizing agent, some organic solvent(s) and so on, may be reused by adding to a second PIE ARC to induce phase inversion.

Following phase inversion, additional optional surfactant, water or optional neutralizing agent optionally may be added to dilute the phase inversed emulsion, although not required. Following phase inversion, the phase inversed emulsion may be cooled to room temperature (RT), for example from about 20° C. to about 25° C.

The resulting latex can be washed, and the resin particles separated and obtained from the O/W emulsion. The resin particles can be washed one or more times with DIW, dried and stored; or optionally can be washed and then used to make toner.

Toner

The resulting latex then may be utilized to form toner by any method within the purview of those skilled in the art. The latex emulsion may be contacted with an optional colorant optionally in a dispersion, an optional wax and other reagents to form toner by a suitable process, in embodiments, an emulsion aggregation (EA) and coalescence process. The toner particles may be prepared by any other suitable method of preparing toner particles including, chemical processes, such as, suspension and encapsulation processes disclosed in U.S. Pat. Nos. 5,290,654 and 5,302,486, the entire disclosure of each of which herein is incorporated by reference in entirety.

In an EA process, an optional colorant, an optional wax and an other desired or required reagent, and resin particles described herein, optionally in surfactants as described above, are mixed and allowed to form particles, for example, in the presence of an aggregating agent or coagulant as known in the art. Particle growth is stopped, an optional shell is added and then optionally, the particles are coalesced to obtain the finalized toner particles. The toner particles can be washed. The toner particles can be mixed with surface additives. The toner particles can be combined with a carrier to make a developer.

The toner can be made in, for example, a batch reactor or in continuous reactor or a micro reactor.

The resulting toner or developer can be used, for example in any known xerographic or electrophotographic device as known in the art.

The subject matter now will be exemplified in the following non-limiting examples. Parts and percentages are by weight unless otherwise indicated.

EXAMPLES

Example 1

The ARC Apparatus

The design of ARC is a column made from standard tubing sizes (2" tubing for ID and 3" tubing for jacket OD) and connections for ease of cleaning. The impeller is a rod coaxially mounted with two plates fabricated from standard perforated plate geometry welded tangentially to the surface of the rod. Each plate is mounted on opposite surfaces of the rod and is parallel to each other. The perforations on each plate comprise about half of the surface area. The drive and seal are located at the top of the reactor preventing the need for complex double-mechanical seals, which typically require ancillary equipment to provide lubrication to maintain seal integrity. Inlet and outlet ports for fluid (e.g. emulsion) flow into and out of the ARC are present at opposite ends. Water inlet ports are located either inline before fluid is added to the ARC or adjacent to the inlet port of the ARC. Additional water inlet port(s) may be present in the mid sections of the ARC. Inlet and outlet ports for temperature-controlled fluid (e.g. water) are located in the tubing jacket.

Example 2

Preparation of Polyester Resin Solution

A mixture of polyester resin solution with a ratio of resin/MEK/IPA/10% $NH_3$/DIW of 10/6/1/0.11/5 by weight is prepared in a mixing tank. The polyester resin, methyl ethyl ketone (MEK), isopropyl alcohol (IPA), DM and 10% $NH_3$ are heated to approximately 40° C. while stirring to aid in dissolution of the polyester approximately 30 minutes. At the end of the cycle, the mixing tank containing the dissolved resin solution is discharged into a feeding tank. Additional batches of polyester resin are made and added to the feeding tank. The feeding tank is stirred at the appropriate temperature.

The homogenous resin solution is metered and fed into the bottom of a first ARC and a suitable amount of 10% ammonia based on the acid number of the resin (for example, at a weight ratio of 0.21) is added to the ARC to neutralize the resin. The residence time in the first ARC is determined by the feed rate and volume of the ARC and as an example, a residence time of approximately 5 minutes may be utilized to obtain a homogeneous neutralized polyester resin solution that exits the first ARC. The materials in the mixing tank, the feeding tank and the first ARC are maintained at roughly 40° C.

Example 3

Preparation of Polyester Resin Emulsion

The neutralized polyester resin solution then is fed to a second ARC along with a stream of DIW at a ratio of 15:1 (water:resin) at a fixed rate. The DIW stream optionally may be split and injected into the ARC at more than one location along the axis of rotation. The second ARC also is heated to roughly 40° C. and agitation is maintained at a sufficient rpm to attain and maintain homogenous mixing. The total ratio of resin/MEK/IPA/10%$NH_3$/DIW was 10/6/1/0.32/20. The residence time in the second ARC may be about 10 minutes and the formed polyester emulsion had a particle size of 200 nm and solids content of 26.8%.

Example 4

Preparation of Polyester Latex

The polyester emulsion containing the solvents is fed into a vacuum distillation apparatus to strip the solvents and the water from the polyester emulsion. The two distillates are collected, the first being solvent-rich and the second being essentially water, and the two distillates are reused in subsequent resin solubilization steps and phase inversion steps, that is, the distilled solvents are used to dissolve resin, whether in batch or in a microreactor and the water is added to the second or PIE ARC.

Example 5

Process Control

The reaction conditions and process is controlled b the stirring speeds of the mixing tank and feed tank. A periodic transfer pump empties the mixing tank into the feed tank. The rotational speed of each ARC is controlled separately. The fluid processing can be controlled by no more than three pumps, although more can be used, the feed pump transferring polyester resin solution to the neutralizing first ARC, an ammonium hydroxide pump controlling ammonium hydroxide solution to the first ARC and the DIW pump feeding DIW to the phase inversion emulsification in the second ARC. The solvent stripping distillation apparatus is controlled separately. The temperature of each tank and the ARC's also are controlled separately.

The process can be controlled by as general purpose computer where the mixing rates, pump rates, agitation rates and temperatures are set to a standard. By adjusting various control standards, the entire PIE process is optimized as needed.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, are also intended to be encompassed by the following claims. Unless specifically recited in a claim, steps or components of claims should not be implied or imported from the specification or any other claims as to any particular order, number, position, size, shape, angle, color or material.

All references cited herein are incorporated herein by reference in entirety.

We claim:

1. A method for preparing a resin emulsion comprising:
   a) combining a resin, a solvent, an optional neutralizing agent, an optional surfactant and water to form a mixture;
   b) adding additional water and said mixture to a continuous agitated reactor column (ARC) to form continuously an oil in water (O/W) emulsion comprising resin particles; and
   c) collecting the resin particles from said O/W emulsion.

2. The method of claim 1, comprising combining said neutralizing agent in said mixture.

3. The method of claim 1, wherein said combining occurs in a separate ARC.

4. The method of claim 1, wherein said solvent comprises more than one solvent.

5. The method of claim 1, wherein said solvent comprises methyl ethyl ketone, isopropyl alcohol or both.

6. The method of claim 1, wherein said resin comprises a polyester.

7. The method of claim 2, wherein said neutralizing agent comprises ammonia or ammonium hydroxide.

8. The method of claim 3, wherein said separate ARC is operated at an elevated temperature.

9. The method of claim 1, wherein said ARC is operated at an elevated temperature.

10. The method of claim 1, wherein said ARC is operated at a mixing speed of from about 10 rpm to about 300 rpm.

11. The method of claim 3, wherein said separate ARC is operated at a mixing speed of from about 10 rpm to about 300 rpm.

12. The method of claim 1, wherein said solvent is obtained from a prior phase inversion emulsification (PIE) reaction.

13. The method of claim 1, wherein said additional water is obtained from a prior phase inversion emulsification (PIE) reaction.

14. The method of claim 3, wherein said separate ARC is operated at a temperature from about 25° C. to about 120° C.

15. The method of claim 1, wherein said ARC is operated at a temperature from about 25° C. to about 120° C.

16. The method of claim 1, wherein said mixture is contained in said ARC for a residence time in the range of from about 0.5 to about 20 min.

17. The method of claim 3, wherein said mixture is contained in said separate ARC for a residence time in the range of from about 0.5 to about 20 min.

18. The method of claim 1, wherein solvent is present in an amount of from about 10 to about 400% by weight of said resin.

19. The method of claim 1, wherein said neutralizing agent is present in an amount to provide a neutralizing ratio of from about 25 to about 500%.

20. The method of claim 1, further comprising (d) combining said resin particles with one or more of an amorphous resin, crystalline resin, colorant and wax to form a toner.

* * * * *